US011655993B2

(12) United States Patent
Delgoshaei et al.

(10) Patent No.: US 11,655,993 B2
(45) Date of Patent: May 23, 2023

(54) SOUND-BASED DIAGNOSTICS FOR A COMBUSTION AIR INDUCER

(71) Applicant: Lennox Industries Inc., Richardson, TX (US)

(72) Inventors: Payam Delgoshaei, Addison, TX (US); Glenn William Kowald, Carrollton, TX (US)

(73) Assignee: Lennox Industries Inc., Richardson, TX (US)

( * ) Notice: Subject to any disclaimer, the term of this patent is extended or adjusted under 35 U.S.C. 154(b) by 109 days.

(21) Appl. No.: 17/333,543

(22) Filed: May 28, 2021

(65) Prior Publication Data

US 2022/0381463 A1  Dec. 1, 2022

(51) Int. Cl.
*F24F 11/38* (2018.01)
*F24F 11/56* (2018.01)
(Continued)

(52) U.S. Cl.
CPC .............. *F24F 11/38* (2018.01); *F24F 11/56* (2018.01); *F24F 11/63* (2018.01); *F24F 11/64* (2018.01);
(Continued)

(58) Field of Classification Search
CPC .. F24F 11/38; F24F 11/56; F24F 11/63; F24F 11/64; F27D 21/04; F27D 2019/0009;
(Continued)

(56) References Cited

U.S. PATENT DOCUMENTS

| 5,120,214 A | * | 6/1992 | West | F23N 5/16 |
| | | | | 431/12 |
| 2013/0166051 A1 | * | 6/2013 | Eaton | F24F 11/64 |
| | | | | 700/94 |

(Continued)

OTHER PUBLICATIONS

Ravi S. Srinivasan, Smart Audio Sensing-Based HVAC Monitoring: Foundations, Principles, and Applications, Jun. 2017, Smart Cities, pp. 669-695 (Year: 2017).*
Delgoshaei, P. et al., "Sound-Based Prognostics for a Combustion Air Inducer," U.S. Appl. No. 17/333,364, filed May 28, 2021, 48 pages.
(Continued)

*Primary Examiner* — Kenneth M Lo
*Assistant Examiner* — Tameem D Siddiquee
(74) *Attorney, Agent, or Firm* — Baker Botts L.L.P.

(57) ABSTRACT

A device is configured to operate a Heating, Ventilation, and Air Conditioning (HVAC) system. The device is further configured to determine that the speed of a combustion air inducer exceeds a speed threshold value. The device is further configured to receive an audio signal from a microphone while operating the HVAC system and to determine an audio signature for the combustion air inducer is not present within the audio signal. The device is further configured to determine whether an audio signature for the integrated furnace controller is present within the audio signal. The device is further configured to determine a fault type based on the determination of whether the audio signature for the integrated furnace controller is present within the audio signal, to identify a component identifier for a component of the HVAC system that is associated with fault type, and to output a recommendation identifying the component identifier.

20 Claims, 6 Drawing Sheets

(51) Int. Cl.
*F24F 11/63* (2018.01)
*F24F 11/64* (2018.01)
*F27D 21/04* (2006.01)
*G05B 13/02* (2006.01)
*G10L 25/51* (2013.01)
*F27D 21/00* (2006.01)
*F27D 19/00* (2006.01)

(52) U.S. Cl.
CPC ........... F27D 21/04 (2013.01); G05B 13/028 (2013.01); G10L 25/51 (2013.01); *F27D 2019/0009* (2013.01); *F27D 2019/0084* (2013.01); *F27D 2021/0057* (2013.01)

(58) Field of Classification Search
CPC ..... F27D 2019/0084; F27D 2021/0057; G05B 13/028; G10L 25/51
See application file for complete search history.

(56) References Cited

U.S. PATENT DOCUMENTS

| | | | |
|---|---|---|---|
| 2015/0354834 A1* | 12/2015 | Barone | F24H 9/2085 431/2 |
| 2018/0031256 A1* | 2/2018 | Gillette | F24F 11/38 |
| 2020/0066298 A1* | 2/2020 | Yelchuru | G05B 23/0229 |
| 2021/0221196 A1* | 7/2021 | Fridman | B60H 1/00557 |

OTHER PUBLICATIONS

Delgoshaei, P. et al., "Time-Based and Sound-Based Diagnostics for a Heating, Ventilation, and Air Conditioning Burner Assembly," U.S. Appl. No. 17/333,416, filed May 28, 2021, 49 pages.

Delgoshaei, P. et al., "Time-Based and Sound-Based Prognostics for Restrictions Within a Heating, Ventilation, and Air Conditioning System," U.S. Appl. No. 17/333,488, filed May 28, 2021, 49 pages.

Delgoshaei, P. et al., "Time-Based and Sound-Based Diagnostics for Restrictions Within a Heating, Ventilation, and Air Conditioning System," U.S. Appl. No. 17/333,598, filed May 28, 2021, 49 pages.

* cited by examiner

US 11,655,993 B2

SOUND-BASED DIAGNOSTICS FOR A COMBUSTION AIR INDUCER

TECHNICAL FIELD

The present disclosure relates generally to Heating, Ventilation, and Air Conditioning (HVAC) system control, and more specifically to sound-based diagnostics for a combustion air inducer.

BACKGROUND

Existing heating, ventilation, and air conditioning (HVAC) systems typically can only provide a general alert when there is an issue with an HVAC system. For example, the HVAC system may report that an error has occurred while trying to operate the HVAC system and that a service is required to repair the HVAC system. Existing HVAC systems cannot typically self-diagnose any issues with the HVAC system. This means that a technician will need to inspect the HVAC system and make repairs to the HVAC system. In many instances, a technician will need to make multiple trips to a location to first diagnose the issue with an HVAC system and then to return with the appropriate parts and tools for servicing the HVAC system. This process results in an extended amount of downtime while the technician diagnoses and makes repairs to the HVAC system.

SUMMARY

The system disclosed in the present application provides a technical solution to the technical problems discussed above by providing a sound-based HVAC diagnostic system that is configured to detect faults and issues within an HVAC system based on sounds made by the components of the HVAC system. The disclosed system provides several practical applications and technical advantages which include a process that enables an HVAC system to self-diagnose faults within the HVAC system and to output information that identifies any faulty components of the HVAC system and/or instructions for servicing the HVAC system. These features reduce the amount of downtime that an HVAC system will experience because the HVAC system is able to output information that identifies the components that are causing the issues that the HVAC system is experiencing. This process provides a practical application that allows a technician to be prepared with all of the necessary equipment (i.e. parts and tools) and instructions for servicing the HVAC system without having to first diagnose the HVAC system themselves.

In addition, existing HVAC systems rely on a manual inspection of an HVAC system for diagnosing issues and faulty components of the HVAC system. Such a manual process is susceptible to misdiagnosing issues with an HVAC system or overlooking some faulty components that may need replacing or servicing. The HVAC system may experience additional downtime when an HVAC system is misdiagnosed and/or not all of the correct components are serviced. In contrast, the self-diagnosing feature of the disclosed HVAC system provides a practical application that ensures that the HVAC system will be correctly diagnosed and serviced at the outset which prevents further downtime for the HVAC system.

In one embodiment, the system comprises a device that is configured to determine that the speed of a combustion air inducer has exceeded a speed threshold value while operating an HVAC system. The device is further configured to receive an audio signal from a microphone while operating the HVAC system, to identify an audio signature for the combustion air inducer, and to determine the audio signature for the combustion air inducer is present within the audio signal. The device is further configured to determine a fault type based on the determination that the audio signature for the combustion air inducer is present within the audio signal, to identify a component identifier for a component of the HVAC system that is associated with fault type, and to output a recommendation identifying the component identifier.

In another embodiment, the system comprises a device that is configured to determine that the amount of time to ignite a burner in a burner assembly has exceeded a time threshold value and that a flame was not detected by a flame sensor while operating an HVAC system. The device is further configured to receive an audio signal from a microphone while operating the HVAC system, to identify an audio signature for the flame, and to determine whether the audio signature for the flame is present within the first audio signal. The device is further configured to determine a fault type based on the determination of whether the audio signature for the flame is present within the audio signal, to identify a component identifier for a component of the HVAC system that is associated with fault type, and to output a recommendation identifying the component identifier.

In another embodiment, the system comprises a device that is configured to determine that the amount of time to close a pressure switch exceeds a time threshold value while operating an HVAC system. The device is further configured to receive an audio signal from a microphone while operating the HVAC system, to identify an audio signature for the combustion air inducer, and to determine the audio signature for the combustion air inducer is present within the audio signal. The device is further configured to determine a fault type based on the determination that the audio signature for the combustion air inducer is present within the audio signal, to identify a component identifier for a component of the HVAC system that is associated with fault type, and to output a recommendation identifying the component identifier.

In another embodiment, the system comprises a device that is configured to determine that the speed of a combustion air inducer exceeds a speed threshold value while operating an HVAC system. The device is further configured to receive an audio signal from a microphone while operating the HVAC system and to determine an audio signature for the combustion air inducer is not present within the audio signal. The device is further configured to determine whether an audio signature for the integrated furnace controller is present within the audio signal. The device is further configured to determine a fault type based on the determination of whether the audio signature for the integrated furnace controller is present within the audio signal, to identify a component identifier for a component of the HVAC system that is associated with fault type, and to output a recommendation identifying the component identifier.

In another embodiment, the system comprises a device that is configured to determine that the amount of time to close a pressure switch exceeds a time threshold value while operating an HVAC system. The device is further configured to receive an audio signal from a microphone while operating the HVAC system and to determine that an audio signature for a combustion air inducer is not present within the audio signal. The device is further configured to determine whether an audio signature for an integrated furnace controller is present within the audio signal. The device is further configured to determine a fault type based on the determination of whether the audio signature for the integrated furnace controller is present within the audio signal, to identify a component identifier for a component of the HVAC system that is associated with fault type, and to output a recommendation identifying the component identifier.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
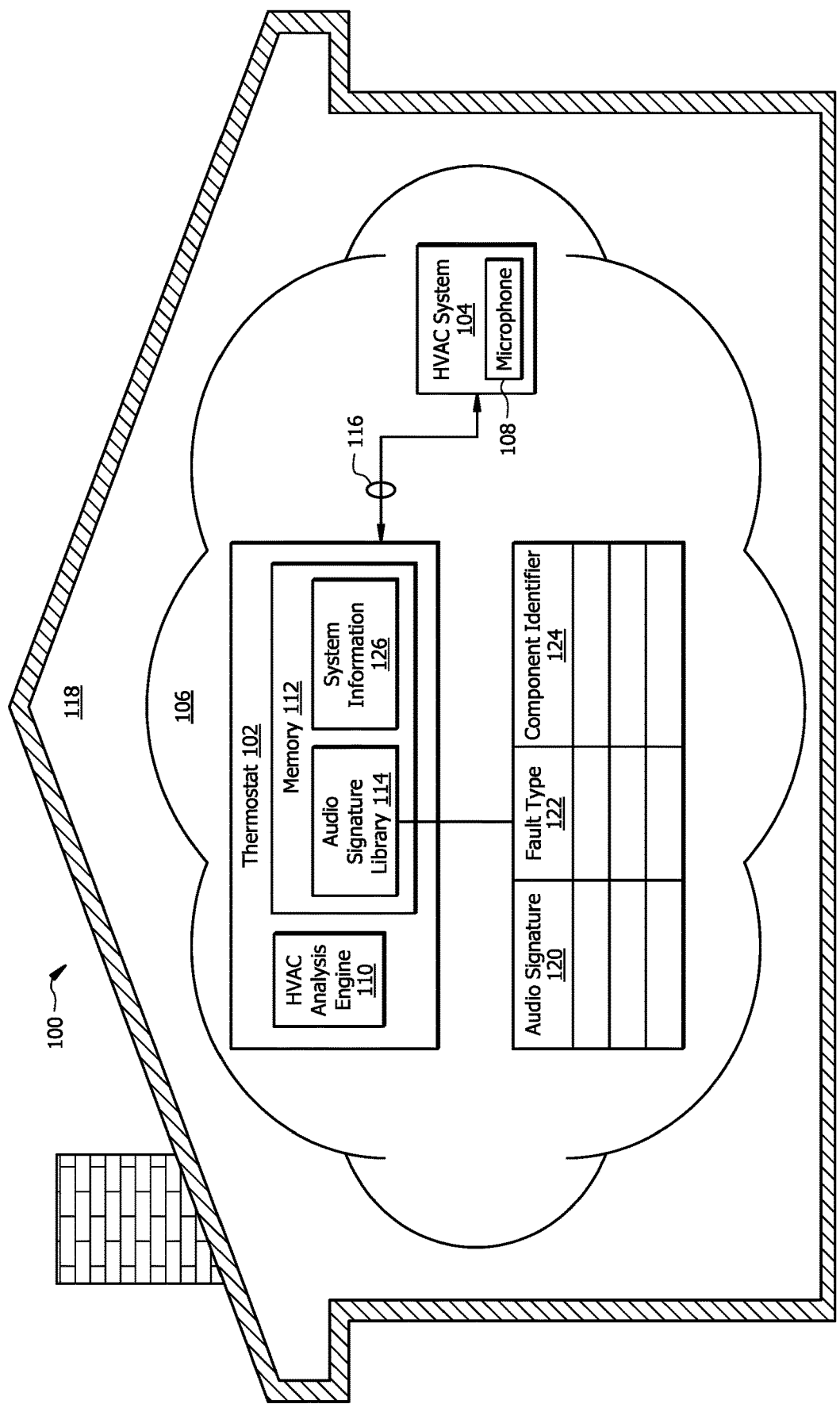
FIG. 1 is a schematic diagram of an embodiment of an analysis system for an HVAC system.

FIG. 1 is a schematic diagram of an embodiment of an analysis system 100 for heating, ventilation, and air conditioning (HVAC) systems 104. The analysis system 100 is generally configured to use sound for detecting and diagnosing faults within an HVAC system 104. More specifically, the analysis system 100 is configured to self-diagnose faults within the HVAC system 104 and to output information that identifies any faulty components of the HVAC system 104 and/or instructions for servicing the HVAC system 104. These features reduce the amount of downtime that an HVAC system 104 will experience because the HVAC system 104 is able to output information about the components that are causing the issues that the HVAC system 104 is experiencing. This process allows a technician to be prepared with all of the necessary equipment (i.e. parts and tools) and instructions for servicing the HVAC system 104 without having to first diagnose the HVAC system 104 themselves.

In one embodiment, the analysis system 100 comprises a thermostat 102, a microphone 108, and an HVAC system 104 that are in signal communication with each other over a network 106. The network 106 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a personal area network (PAN), a wide area network (WAN), and a satellite network. The network 106 may be configured to support any suitable type of communication protocol as would be appreciated by one of ordinary skill in the art.

HVAC System

An HVAC system 104 is generally configured to control the temperature of a space 118. Examples of a space 118 include, but are not limited to, a room, a home, an apartment, a mall, an office, a warehouse, or a building. The HVAC system 104 may comprise the thermostat 102, a furnace, compressors, blowers, evaporators, condensers, and/or any other suitable type of hardware for controlling the temperature of the space 118. An example of an HVAC system 104 configuration and its components are described in more detail below in FIG. 6. Although FIG. 1 illustrates a single HVAC system 104, a location or space 118 may comprise a plurality of HVAC systems 104 that are configured to work together. For example, a large building may comprise multiple HVAC systems 104 that work cooperatively to control the temperature within the building.

Microphones

The analysis system 100 may comprise one or more microphones 108. The microphones 108 may be positioned at various locations within the HVAC system 104. The microphones 108 are generally configured to record the sounds that are made by electrical and mechanical components of the HVAC system 104. For example, a microphone 108 may be positioned proximate or adjacent to an integrated furnace controller (IFC) 602, a relay, a flame sensor 640, a burner 618, a combustion air inducer (CAI) 606, a gas valve 626, a gas supply 634, a burner assembly 624, a furnace, or any other component of the HVAC system 104. Each microphone 108 is configured to capture audio signals 116 of one or more components of the HVAC system 104. A microphone 108 may be configured to capture audio signals 116 continuously, at predetermined intervals, or on-demand. Each microphone 108 is operably coupled to the HVAC analysis engine 110 and provides captured audio signals 116 to the HVAC analysis engine 110 for processing.

Thermostat

The thermostat 102 is generally configured to collect sound information for various components of the HVAC system 104 while operating the HVAC system 104 and to diagnosis faults within the HVAC system 104 based on the sound information. An example of the thermostat 102 in operation is described below in FIGS. 2-4. In one embodiment, the thermostat 102 comprises an HVAC analysis engine 110 and a memory 112. The thermostat 102 may further comprise a graphical user interface, a display 508, a touch screen, buttons, knobs, or any other suitable combination of components. Additional details about the hardware configuration of the thermostat 102 are described in FIG. 5.

The HVAC analysis engine 110 is generally configured to control the operation of the HVAC system 104, to receive audio signals 116 from one or more microphones 108 of the components of the HVAC system 104 while the HVAC system 104 operates, and to detect and diagnose faults within the HVAC system 104 based on the audio signals 116. An example of the HVAC analysis engine 110 in operation is described in FIGS. 2-4. In some embodiments, the HVAC analysis engine 110 may employ hardware resources from a remote or cloud server to process the audio signals 116 to detect and diagnose faults within the HVAC system 104.

The memory 112 is configured to store an audio signature library 114, system information 126, and/or any other suitable type of data. The audio signature library 114 comprises information that can be used with a visual representation (e.g. a plot or graph) of an audio signal 116 to determine whether a fault is present. For example, the audio signature library 114 may be configured to associate audio signatures 120 with fault types 122 and component identifiers 124. An audio signature 120 identifies attributes of an audio signal 116 that can be used to determine whether a fault is present within the HVAC system 104. Examples of audio signatures 120 include, but are not limited to, waveform profiles or patterns, frequency profiles or patterns, threshold values, or any other suitable type of information that can be used with a plot of an audio signal 116 to determine whether a fault is present. The fault type 122 identifies a particular type of issue that the HVAC system 104 is experiencing. Examples of fault types 122 include, but are not limited to, flame sensor faults, gas valve faults, blower faults, motor faults, relay faults, expansion valve faults, or any other suitable type of fault. Each fault type 122 is linked with a component identifier 124 that identifies a component of the HVAC system 104 that is causing the issue. The component identifier 124 may be a part name, a part number, a serial number, a model number, a barcode, or any other suitable type of alphanumeric identifier that uniquely identifies a component of the HVAC system 104. Examples of using the audio signature library 114 are described below in FIGS. 2-4.

The system information 126 comprises information that is associated with the components of the HVAC system 104. The system information 126 may comprise instructions for servicing components of the HVAC system 104, information about tools required for servicing components of the HVAC system 104, information about the physical locations of the components of the HVAC system 104, technical specifications for the components of the HVAC system 104, and/or any other suitable type of information that is associated with the components of the HVAC system 104.

Analysis Process for a Burner Assembly

Figure 2:
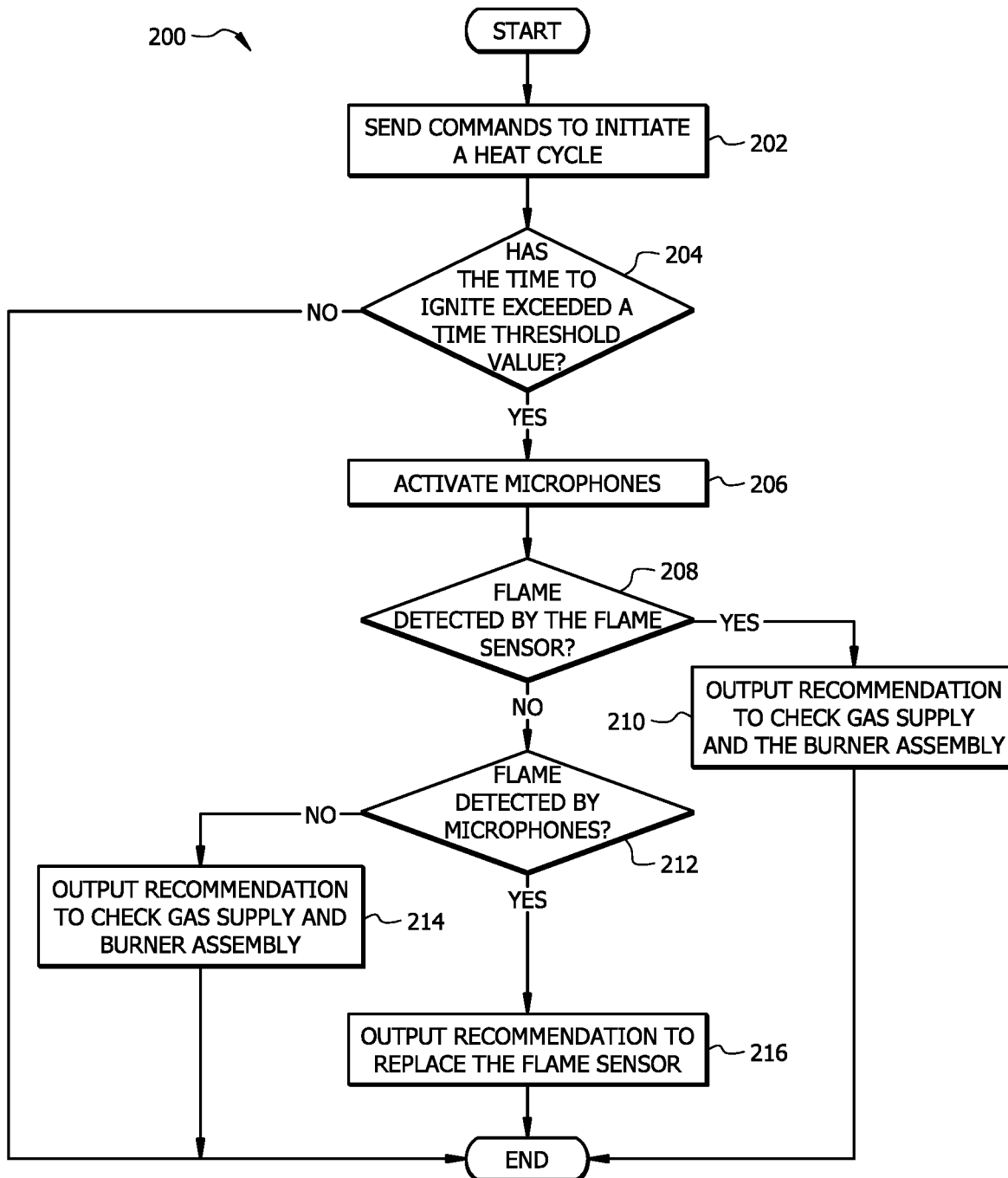
FIG. 2 is a flowchart of an embodiment of an analysis process for a burner assembly in an HVAC system.

FIG. 2 is a flowchart of an embodiment of an analysis process 200 for a burner assembly 624 in an HVAC system 104. The analysis system 100 may employ process 200 to detect and diagnose faults within a burner assembly 624 of the HVAC system 104 while operating the HVAC system 104. Process 200 enables the analysis system 100 to self-diagnose faults within the burner assembly 624 and to output information that identifies any faulty components of the HVAC system 104 and/or instructions for servicing the HVAC system 104. This process reduces the amount of downtime that an HVAC system 104 will experience because the HVAC system 104 is able to output information about the components that are causing the issues that the HVAC system 104 is experiencing. This process allows a technician to be prepared with all of the necessary equipment (i.e. parts and tools) and instructions for servicing the HVAC system 104 without having to first diagnose the HVAC system 104 themselves. Process 200 may be implemented by the thermostat 102, the IFC 602, or a combination of the thermostat 102 and the IFC 602.

At step 202, the thermostat 102 sends commands to initiate a heat cycle. Here, the thermostat 102 sends instructions or commands to the HVAC system 104 to control the operation of the HVAC system 104. For example, thermostat 102 may send a command to the IFC 602 that triggers the IFC 602 to ignite a flame for one or more burners 618 in the burner assembly 624 in response to a user input requesting heat for a space 118. The thermostat 102 may send commands to the HVAC system 104 using any suitable protocol.

At step 204, the thermostat 102 determines whether the time to ignite the burners 618 in the burner assembly 624 has exceeded a predetermined time threshold value. After sending the commands to the HVAC system 104, the IFC 602 begins measuring the amount of time it takes to ignite the burners 618. The IFC 602 then reports the amount of time that has elapsed to the thermostat 102. The thermostat 102 compares the amount of measured time to a time threshold value. The time threshold value corresponds with a maximum amount of time for the burners 618 to ignite before the thermostat 102 begins troubleshooting the HVAC system 104 for issues related to the burner assembly 624. The time threshold value may be set to four seconds, six seconds, ten seconds, or any other suitable duration of time. The thermostat 102 terminates process 200 in response to determining that the time to ignite the burners 618 in the burner assembly 624 does not exceed the time threshold value. In this case, the thermostat 102 determines that the burners 618 were able to successfully ignite within the predetermined amount of time. In some instances, the thermostat 102 may use the IFC 602 and/or the flame sensor 640 to verify that a flame was detected and that the burners 618 were able to successfully ignite. This means that the HVAC system 104 is working properly and that no troubleshooting is necessary.

Otherwise, the thermostat 102 proceeds to step 206 in response to determining that the amount of time to ignite the burners 618 in the burner assembly 624 has exceeded the time threshold value. In this case, the thermostat 102 begins the troubleshooting process to identify potential issues within the HVAC system 104. At step 206, the thermostat 102 activates one or more microphones 108. The thermostat 102 activates the one or more microphones 108 by transitioning the microphones 108 from an inactive state to an active state. In the inactive state, the microphones 108 are not configured to capture audio signals 116 or to send audio signals 116 to the thermostat 102 for processing. In the active state, the microphones 108 are configured to capture audio signals 116 and to send audio signals 116 to the thermostat 102 for processing.

At step 208, the thermostat 102 determines whether a flame has been sensed by the flame sensor 640 of the HVAC system 104. Here, the thermostat 102 checks the flame sensor 640 to determine whether the flame sensor 640 has detected a flame within the burner assembly 624. The thermostat 102 may check the status of the flame sensor 640 using any suitable technique. For example, the thermostat 102 may determine whether an electrical signal has been received from the flame sensor 640. The electrical signal from the flame sensor 640 indicates that the flame sensor 640 has detected a flame. The thermostat 102 proceeds to step 210 in response to determining that a flame has been sensed by the flame sensor 640. In this case, the thermostat 102 determines that the burners 618 were able to successfully ignite. However, since the amount of time it took to ignite the burners 618 exceeded the time threshold value, the thermostat 102 will identify potential issues with the HVAC system 104 that may have caused the delay to ignite the burners 618. For example, the thermostat 102 may identify a fault type that is associated with the gas supply 634 and/or the burner assembly 624.

At step 210, the thermostat 102 outputs a recommendation to check the gas supply 634 and the burner assembly 624. For example, the thermostat 102 may identify component identifiers 124 for the gas supply 634 and/or the burner assembly 624 and then output a recommendation that includes the component identifiers 124 and instructions to check the gas supply 634 and/or burner assembly 624. In one example, the thermostat 102 may output recommendation by displaying the recommendation on a graphical user interface (e.g. display 508) of the thermostat 102. In this example, the thermostat 102 allows a user to identify the causes for the issue locally by interacting with the graphical user interface of the thermostat 102. The information associated with the issue may also be accessible from a user device that is configured to communicate with the thermostat 102. For instance, a user may be able to access the information that is associated with the fault using a mobile application or an Internet browser on a user device.

In another example, the thermostat 102 may output the recommendation by sending the information to a device that is located outside of the space 118. In this example, the thermostat 102 allows a user to identify the causes for an issue remotely. For instance, the thermostat 102 may send the component identifiers 124 and other information to a user device that is associated with a technician that will service the HVAC system 104. This process allows the technician to obtain information about the components that need to be serviced or replaced before the technician arrives to the space 118. This feature reduces the downtime of the HVAC system 104 by providing diagnostic information to the technician before the technician arrives which reduces the amount of time required to diagnose issues with the HVAC system 104 and to service the HVAC system 104.

Returning to step 208, the thermostat 102 proceeds to step 212 in response to determining that a flame was not sensed by the flame sensor 640. In this case, the thermostat 102 determines whether the burners 618 were able to successfully ignite by checking an audio signal 116 captured by the microphones 108 for the presence of an audio signature 120 that is associated with the flame. At step 212, the thermostat 102 determines whether a flame was sensed by the microphones 108. The thermostat 102 uses the microphones 108 to capture an audio signal 116 of the components of the HVAC system 104 while the HVAC system 104 is operating or while the HVAC system 104 attempts to execute the commands that were provided by the thermostat 102. The thermostat 102 may be configured to capture the audio signal 116 for any suitable duration of time. In some embodiments, the thermostat 102 may combine audio signals from multiple microphones that are distributed within the HVAC system 104 to form an aggregated audio signal 116. This process allows the thermostat 102 to collect and use sound information for more components of the HVAC system 104.

In one embodiment, the thermostat 102 generates a plot of the audio signal 116. The thermostat 102 may generate any suitable type of graphical or visual representation of the audio signal 116 that can be used for detecting and diagnosing faults within the HVAC system 104. For example, the thermostat 102 may generate a plot of amplitudes for the audio signal 116 over time. As another example, the thermostat 102 may generate a plot (e.g. a spectrogram) of frequencies for the audio signal 116 over time. For example, the thermostat 102 may apply a Fast Fourier Transformation (FFT) to the audio signal 116 to generate the spectrogram or plot of the frequencies for the audio signal 116 over time.

After generating a representation of the audio signal 116, the thermostat 102 identifies one or more audio signatures 120 from the audio signature library 114 based on the commands that the thermostat 102 uses to control the operation of the HVAC system 104. In this example, the thermostat 102 may identify the audio signatures 120 that are associated with the flame of the burners 618 in the burner assembly 624. The thermostat 102 then compares the audio signatures 120 to the plot of the audio signal 116. The thermostat 102 may compare the attributes of each audio signature 120 to at least a portion of the visual representation of the audio signal 116 to determine whether the audio signature 120 is present within the audio signal 116. The thermostat 102 then determines whether a fault was detected based on the comparison. For example, the thermostat 102 may be configured to detect a fault when an audio signature 120 is not present within the plot of the audio signal 116. In this case, the audio signatures 120 correspond with attributes that should be present in the plot of the audio signal 116 when the components of the HVAC system 104 are operating normally. As another example, the thermostat 102 may detect a fault based on the presence or absence of specific frequencies within the plot of the audio signal 116. In this case, an audio signature 120 may correspond with one or more frequency values. The thermostat 102 uses the audio signatures 120 to determine whether the frequency values are present within the plot of the audio signal 116. In this example, the audio signatures 120 correspond with attributes that should be present in the plot of the audio signal 116 when the HVAC system 104 is operating normally.

In some embodiments, the thermostat 102 may be configured to detect a fault by analyzing the frequency content of the audio signal 116. For example, the thermostat 102 may perform a Fast Fourier Transformation on the audio signal 116 to identify the frequency content of the audio signal 116. The thermostat 102 may then determine whether one or more predetermined frequencies are present within the frequency content of the audio signal 116. In this example, the thermostat 102 may detect a fault when one or more of the predetermined frequencies are not present within the frequency content of the audio signal 116. In some embodiments, the thermostat 102 may use this process without generating a visual representation (e.g. a plot) of the audio signal 116.

The thermostat 102 proceeds to step 214 in response to determining that a flame was not sensed by the microphones 108. In this case, the thermostat 102 determines that there is an issue with one or more components of the HVAC system 104. For example, the thermostat 102 may identify a fault type that is associated with the gas supply 634 and/or the burner assembly 624. At step 214, the thermostat 102 outputs a recommendation to check the gas supply 634 and the burner assembly 624. The thermostat 102 may generate the recommendation using a process similar to the process described in step 210. For example, the thermostat 102 may identify component identifiers 124 for the gas supply 634 and/or the burner assembly 624 and then output a recommendation that includes the component identifiers 124 and instructions to check the gas supply 634 and/or burner assembly 624. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

Returning to step 212, the thermostat 102 proceeds to step 216 in response to determining that a flame was sensed by the microphones 108. In this case, the thermostat 102 determines that there is an issue with the flame sensor 640 of the HVAC system 104 and identifies a fault type that is associated with the flame sensor 640. At step 216, the thermostat 102 outputs a recommendation to replace the flame sensor 640. The thermostat 102 may generate the recommendation using a process similar to the process described in step 210. For example, the thermostat 102 may identify a component identifier 124 for the flame sensor 640 and then output a recommendation that includes the component identifier 124 and instructions to replace the flame sensor 640. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

In some embodiments, the thermostat 102 may also output instructions for repairing the detected fault. After detecting a fault, the thermostat 102 may output information about the components of the HVAC system 104 that are associated with the fault and/or any other information that can be used to service the HVAC system 104. For example, the thermostat 102 may output a component identifier 124 for any components that are associated with the detected fault, location information about where the identified components are located within the HVAC system 104, service instructions for how to repair or replace the identified components, tools for servicing the identified components, and/or any other suitable type of information that is associated with the identified components of the HVAC system 104.

Speed-Based and Sound-Based Analysis Process for a Combustion Air Inducer

Figure 3:
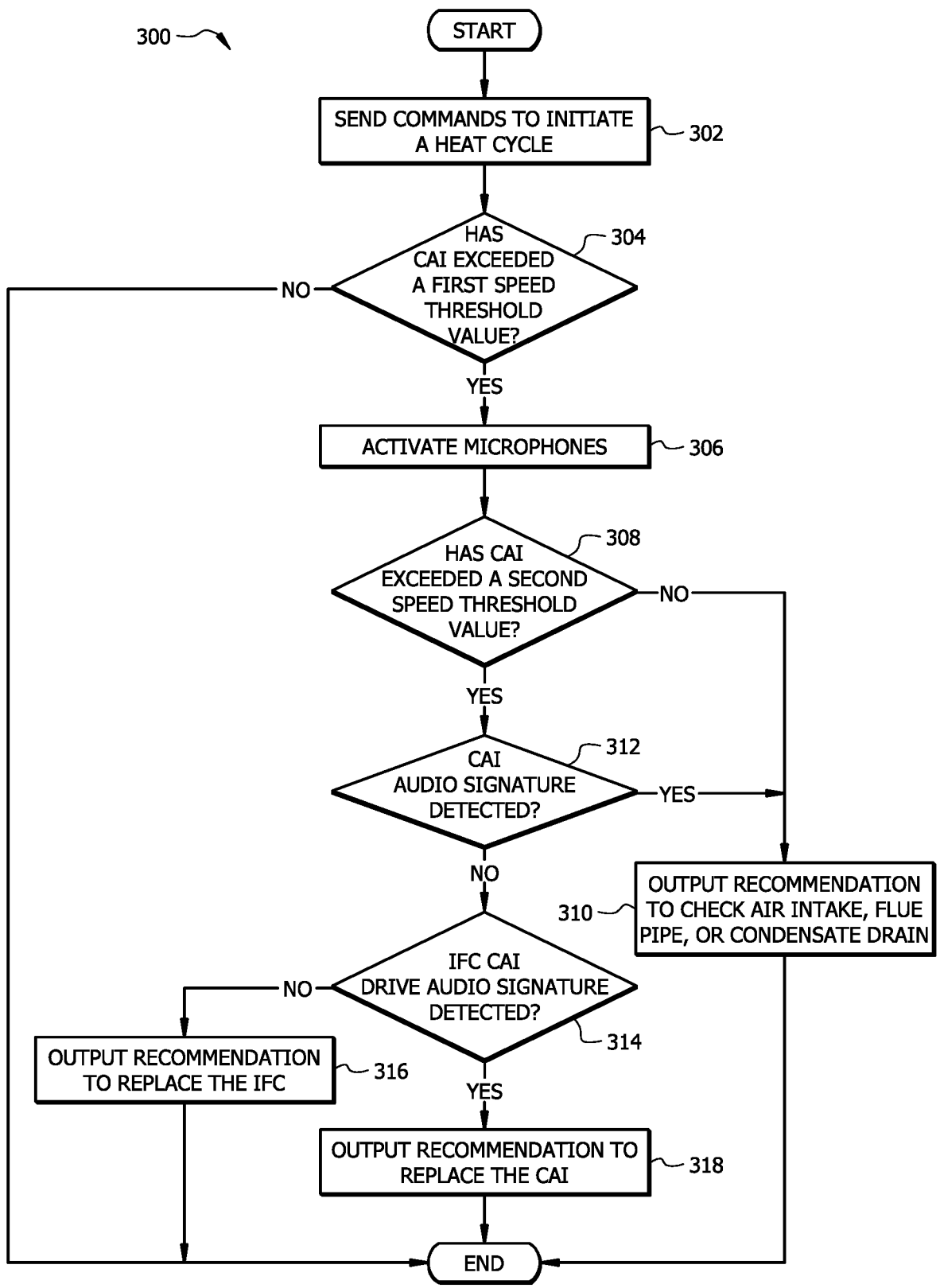
FIG. 3 is a flowchart of an embodiment of a sound-based analysis process for a combustion air inducer in an HVAC system.

FIG. 3 is a flowchart of an embodiment of a sound-based analysis process 300 for a CAI 606 in an HVAC system 104. The analysis system 100 may employ process 300 to detect and diagnose faults associated with the CAI 606 of the HVAC system 104 while operating the HVAC system 104. Process 300 uses a speed-based and sound-based analysis process that enables the analysis system 100 to self-diagnose faults associated with the CAI 606 and to output information that identifies any faulty components of the HVAC system 104 and/or instructions for servicing the HVAC system 104. This process reduces the amount of downtime that an HVAC system 104 will experience because the HVAC system 104 is able to output information about the components that are causing the issues that the HVAC system 104 is experiencing. Process 300 may be implemented by the thermostat 102, the IFC 602, or a combination of the thermostat 102 and the IFC 602.

At step 302, the thermostat 102 sends commands to initiate a heat cycle for the HVAC system 104. Here, the thermostat 102 sends instructions or commands to the HVAC system 104 to control the operation of the HVAC system 104. For example, thermostat 102 may send a command to the IFC 602 that triggers the IFC 602 to activate the CAI 606 of the HVAC system 104 in response to a user input requesting heat for a space 118. The thermostat 102 may send commands to the HVAC system 104 using any suitable protocol.

At step 304, the thermostat 102 determines whether the CAI 606 has exceeded a first speed threshold value. After sending commands to the HVAC system 104, the IFC 602 may begin sending speed request to control the speed of the CAI 606. The IFC 602 may then check to see if the pressure switch 662 has closed. The IFC 602 may continue to send speed request to the CAI 606 until the IFC 602 can determine that the pressure switch 662 has closed or that a predetermined pressure threshold level has been achieved. The IFC 602 reports to the thermostat 102 when the speed of the CAI 606 has exceeded the first speed threshold value. In another example, the thermostat 102 may measure the speed (e.g. rotations per minute (RPM)) of the CAI 606. For instance, the thermostat 102 may determine the speed of the CAI 606 using a speed sensor or tachometer. The thermostat 102 then compares the measured speed of the CAI 606 to the first speed threshold value. The first speed threshold value corresponds with a maximum speed for the CAI 606 before the thermostat 102 begins troubleshooting the HVAC system 104 for issues related to the CAI 606. The first speed threshold value may be set to any suitable speed value. For example, the first speed threshold value may be set to a value of 3,000 RPM. The thermostat 102 terminates process 300 in response to determining that the CAI 606 does not exceed the first speed threshold value. In this case, the thermostat 102 determines that the CAI 606 is operating properly and that no troubleshooting is necessary.

Otherwise, the thermostat 102 proceeds to step 306 in response to determining that the CAI 606 has exceeded the first speed threshold value. In this case, the thermostat 102 begins the troubleshooting process to identify potential issues within the HVAC system 104. At step 306, the thermostat 102 activates one or more microphones 108. The thermostat 102 activates the one or more microphones 108 by transitioning the microphones 108 from an inactive state to an active state. In the inactive state, the microphones 108 are not configured to capture audio signals 116 or to send audio signals 116 to the thermostat 102 for processing. In the active state, the microphones 108 are configured to capture audio signals 116 and to send audio signals 116 to the thermostat 102 for processing.

At step 308, the thermostat 102 determines whether the CAI 606 has exceeded a second speed threshold value. Here, the thermostat 102 may use a process similar to the process described in step 304 to determine whether the CAI 606 has exceeded the second speed threshold value. The thermostat 102 compares the current speed of the CAI 606 to a second speed threshold value that is greater than the first speed threshold value. The second speed threshold value corresponds with a maximum safe operating speed for the CAI 606. The second speed threshold value may be set to any suitable speed value. For example, the second speed threshold value may be set to a value of 4,500 RPM. The thermostat 102 proceeds to step 310 in response to determining that the CAI 606 has not exceeded the second speed threshold value. In this case, the thermostat 102 determines that the CAI 606 is operating at a speed that is within the maximum safe operating speed for the CAI 606. However, since the CAI 606 is operating at a speed that is greater than the first speed threshold value, the thermostat 102 will identify potential issues with the HVAC system 104 that may have caused the increase in the operating speed of the CAI 606. For example, the thermostat 102 may identify a fault type that is associated with the combustion air intake 613, the flue pipe 612, and/or the condensate drain 616 of the HVAC system 104.

At step 310, the thermostat 102 outputs a recommendation to check the combustion air intake 613, the flue pipe 612, and/or the condensate drain 616. The thermostat 102 may generate the recommendation using a process similar to the process described in step 210 of FIG. 2. For example, the thermostat 102 may identify component identifiers 124 for the combustion air intake 613, the flue pipe 612, and/or the condensate drain 616 and then output a recommendation that includes the component identifiers 124 and instructions to check the combustion air intake 613, the flue pipe 612, and/or the condensate drain 616. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

Returning to step 308, the thermostat 102 proceeds to step 312 in response to determining that the CAI 606 has exceeded the second speed threshold value. In this case, the thermostat 102 determines whether the CAI 606 is operating properly by checking an audio signal 116 captured by the microphones 108 for the presence of an audio signature 120 that is associated with the CAI 606. At step 312, the thermostat 102 determines whether a CAI audio signature 120 was detected by the microphones 108. The thermostat 102 may determine whether the CAI audio signature 120 was detected by the microphones 108 using a process similar to the process described in step 212 in FIG. 2. For example, the thermostat 102 may use the microphones 108 to capture an audio signal 116 of the components of the HVAC system 104 while the HVAC system 104 is operating or while the HVAC system 104 attempts to execute the commands that were provided by the thermostat 102. The thermostat 102 may then generate a plot or representation of the audio signal 116 that was captured by the microphones 108. After generating a representation of the audio signal 116, the thermostat 102 identifies one or more audio signatures 120 from the audio signature library 114 based on the commands that the thermostat 102 sent to control the operation of the HVAC system 104. In this example, the thermostat 102 may identify the audio signatures 120 that are associated with the CAI 606. The thermostat 102 then compares the audio signatures 120 to the plot of the audio signal 116. The thermostat 102 may compare the attributes of each audio signature 120 to at least a portion of the visual representation of the audio signal 116 to determine whether the CAI audio signature 120 is present within the audio signal 116. The thermostat 102 then determines whether a fault was detected based on the comparison.

In some embodiments, the thermostat 102 may be configured to detect a fault by analyzing the frequency content of the audio signal 116. For example, the thermostat 102 may perform a Fast Fourier Transformation on the audio signal 116 to identify the frequency content of the audio signal 116. The thermostat 102 may then determine whether one or more predetermined frequencies are present within the frequency content of the audio signal 116. In this example, the thermostat 102 may detect a fault when one or more of the predetermined frequencies are not present within the frequency content of the audio signal 116. In some embodiments, the thermostat 102 may use this process without generating a visual representation (e.g. a plot) of the audio signal 116.

The thermostat 102 proceeds to step 310 in response to determining that the CAI audio signature 120 was detected by the microphones 108. In this case, the thermostat 102 determines that there is an issue with one or more other components of the HVAC system 104. For example, the thermostat 102 may identify a fault type that is associated with the combustion air intake 613, the flue pipe 612, and/or the condensate drain 616 of the HVAC system 104. The thermostat 102 may generate the recommendation using the process described in step 310. Otherwise, the thermostat 102 proceeds to step 314 in response to determining that the CAI audio signature 120 was not detected by the microphones 108. In this case, the thermostat 102 determines that there is an issue with either the CAI 606 or the IFC 602 that controls the CAI 606.

At step 314, the thermostat 102 determines whether an IFC CAI drive audio signature 120 was detected by the microphones 108. The thermostat 102 may determine whether the IFC CAI drive audio signature 120 was detected by the microphones 108 using a process similar to the process described in step 212 in FIG. 2. In this case, the thermostat 102 compares attributes of an audio signal 116 to audio signatures 120 that are associated with the IFC 602 to determine whether the IFC CAI drive audio signature 120 is present within the audio signal 116.

The thermostat 102 proceeds to step 316 in response to determining that the IFC CAI drive audio signature 120 was not detected by the microphones 108. In this case, the thermostat 102 determines that there is an issue with the IFC 602 and identifies a fault type that is associated with the IFC 602. At step 316, the thermostat 102 outputs a recommendation to replace the IFC 602. The thermostat 102 may generate the recommendation using a process similar to the process described in step 210 of FIG. 2. For example, the thermostat 102 may identify a component identifier 124 for the IFC 602 and then output a recommendation that includes the component identifier 124 and instructions to replace the IFC 602. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

Returning to step 314, the thermostat 102 proceeds to step 318 in response to determining that the IFC CAI drive audio signature 120 was detected by the microphones 108. In this case, the thermostat 102 determines that the IFC 602 is working properly and that there is an issue with the CAI 606. The thermostat 102 then identifies a fault type that is associated with the CAI 606. At step 318, the thermostat 102 outputs a recommendation to replace the CAI 606. The thermostat 102 may generate the recommendation using a process similar to the process described in step 210 of FIG. 2. For example, the thermostat 102 may identify a component identifier 124 for the CAI 606 and then output a recommendation that includes the component identifier 124 and instructions to replace the CAI 606. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

In some embodiments, the thermostat 102 may also output instructions for repairing the detected fault. After detecting a fault, the thermostat 102 may output information about the components of the HVAC system 104 that are associated with the fault and/or any other information that can be used to service the HVAC system 104. For example, the thermostat 102 may output a component identifier 124 for any components that are associated with the detected fault, location information about where the identified components are located within the HVAC system 104, service instructions for how to repair or replace the identified components, tools for servicing the identified components, and/or any other suitable type of information that is associated with the identified components of the HVAC system 104.

Time-Based and Sound-Based Analysis Process for a Combustion Air Inducer

Figure 4:
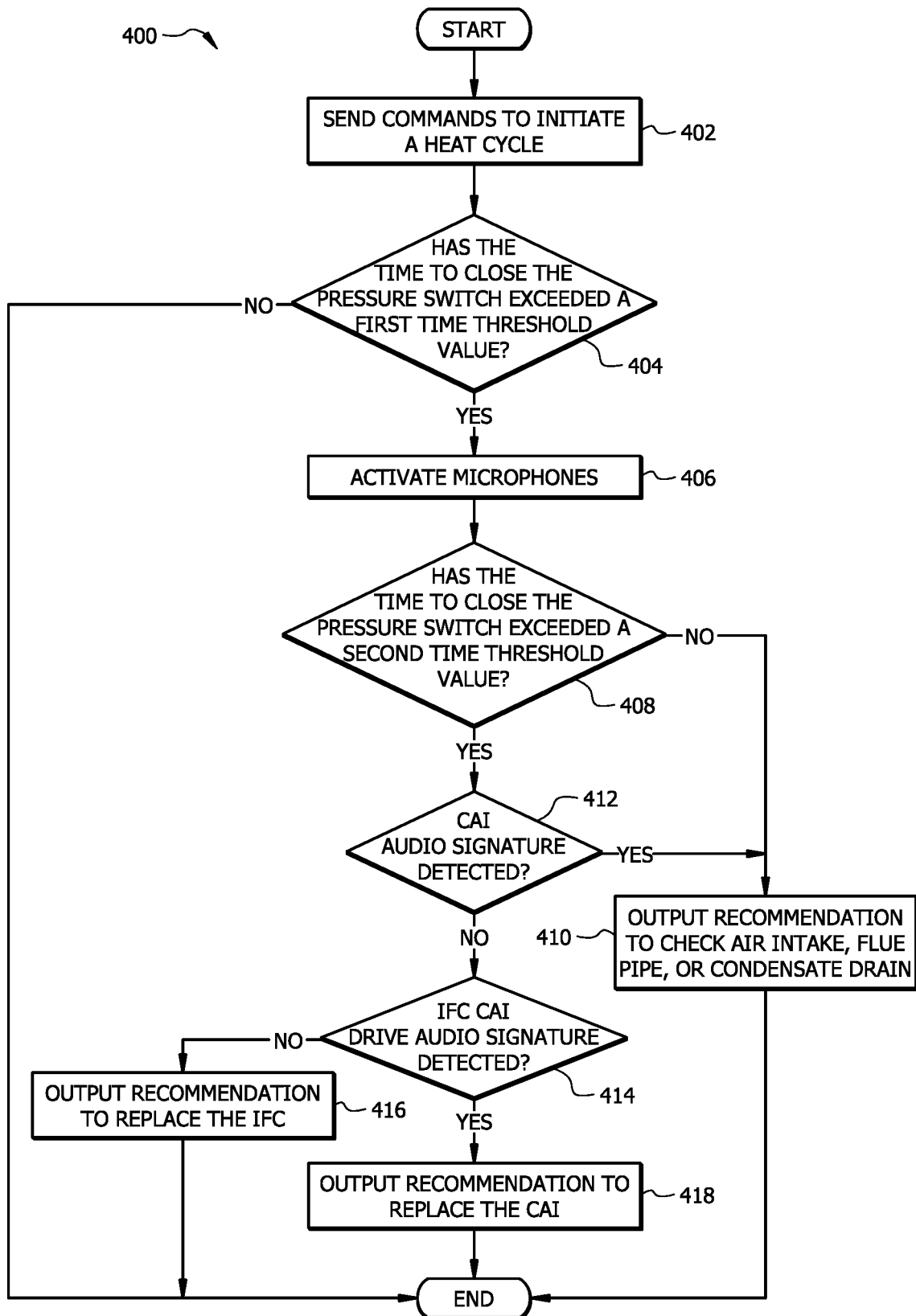
FIG. 4 is a flowchart of an embodiment of a time-based analysis process for a combustion air inducer in an HVAC system.

FIG. 4 is a flowchart of an embodiment of a time-based analysis process 400 for a combustion air inducer in an HVAC system 104. The analysis system 100 may employ process 400 to detect and diagnose faults associated with the CAI 606 of the HVAC system 104 while operating the HVAC system 104. Process 400 uses a time-based and sound-based analysis process that enables the analysis system 100 to self-diagnose faults associated with the CAI 606 and to output information that identifies any faulty components of the HVAC system 104 and/or instructions for servicing the HVAC system 104. This process reduces the amount of downtime that an HVAC system 104 will experience because the HVAC system 104 is able to output information about the components that are causing the issues that the HVAC system 104 is experiencing. Process 400 may be implemented by the thermostat 102, the IFC 602, or a combination of the thermostat 102 and the IFC 602.

At step 402, the thermostat 102 sends commands initiate a heat cycle for the HVAC system 104. Here, the thermostat 102 sends instructions or commands to the HVAC system 104 to control the operation of the HVAC system 104. For example, thermostat 102 may send a command to the IFC 602 that triggers the IFC 602 to activate the CAI 606 of the HVAC system 104 in response to a user input requesting heat for a space 118. The thermostat 102 may send commands to the HVAC system 104 using any suitable protocol.

At step 404, the thermostat 102 determines whether the time to close a pressure switch 662 exceeds a first time threshold value. After sending commands to the HVAC system 104, the IFC 602 begins measuring the amount of time it takes to for the pressure switch 662 to close. The IFC 602 then reports the amount of time that has elapsed to the thermostat 102. The thermostat 102 compares the measured amount of time to the first time threshold value. The first time threshold value corresponds with a maximum amount of time for the pressure switch 662 to close before the thermostat 102 begins troubleshooting the HVAC system 104 for issues related to the CAI 606. The first time threshold value may be set to ten seconds, fifteen seconds, thirty seconds, one minute, or any other suitable duration of time. The thermostat 102 terminates process 400 in response to determining that the time to close the pressure switch 662 does not exceed the first time threshold value. In some instances, the thermostat 102 may use the IFC 602 to determine that the pressure switch 662 was able to successfully close. In this case, the thermostat 102 determines that the CAI 606 is operating properly and that no troubleshooting is necessary.

Otherwise, the thermostat 102 proceeds to step 406 in response to determining that the time to close the pressure switch 662 exceeds the first time threshold value. In this case, the thermostat 102 begins the troubleshooting process to identify potential issues within the HVAC system 104. At step 406, the thermostat 102 activates one or more microphones 108. The thermostat 102 activates the one or more microphones 108 by transitioning the microphones 108 from an inactive state to an active state. In the inactive state, the microphones 108 are not configured to capture audio signals 116 or to send audio signals 116 to the thermostat 102 for processing. In the active state, the microphones 108 are configured to capture audio signals 116 and to send audio signals 116 to the thermostat 102 for processing.

At step 408, the thermostat 102 determines whether the time to close the pressure switch 662 has exceeded a second time threshold value. Here, the thermostat 102 may use a process similar to the process described in step 404 to determine whether the time to close the pressure switch 662 has exceeded the second time threshold value. The thermostat 102 compares the current time to close the pressure switch 662 to a second time threshold value that is greater than the first time threshold value. The second time threshold value corresponds with a maximum amount of time for the pressure switch 662 to safely close. The second time threshold value may be set to any suitable duration of time. The thermostat 102 proceeds to step 410 in response to determining that the time to close the pressure switch 662 has not exceeded the second time threshold value. In this case, the thermostat 102 determines that the pressure switch 662 successfully closed before reaching the second time threshold value. However, since the pressure switch 662 did not close before the first time threshold value, the thermostat 102 will identify potential issues with the HVAC system 104 that may have caused the increase in the amount of time to close the pressure switch 662. For example, the thermostat 102 may identify a fault type that is associated with the combustion air intake 613, the flue pipe 612, and/or the condensate drain 616 of the HVAC system 104.

At step 410, the thermostat 102 outputs a recommendation to check the combustion air intake 613, the flue pipe 612, and/or the condensate drain 616. The thermostat 102 may generate the recommendation using a process similar to the process described in step 210 of FIG. 2. For example, the thermostat 102 may identify component identifiers 124 for the combustion air intake 613, the flue pipe 612, and/or the condensate drain 616 and then output a recommendation that includes the component identifiers 124 and instructions to check the combustion air intake 613, the flue pipe 612, and/or the condensate drain 616. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

Returning to step 408, the thermostat 102 proceeds to step 412 in response to determining that the time to close the pressure switch 662 has exceeded the second time threshold value. In this case, the thermostat 102 determines whether the CAI 606 is operating properly by checking an audio signal 116 captured by the microphones 108 for the presence of an audio signature 120 that is associated with the CAI 606. At step 412, the thermostat 102 determines whether a CAI audio signature 120 was detected by the microphones 108. The thermostat 102 may determine whether the CAI audio signature 120 was detected by the microphones 108 using a process similar to the process described in step 312 of FIG. 3.

The thermostat 102 proceeds to step 410 in response to determining that the CAI audio signature 120 was detected by the microphones 108. In this case, the thermostat 102 determines that there is an issue with one or more other components of the HVAC system 104. For example, the thermostat 102 may identify a fault type that is associated with the combustion air intake 613, the flue pipe 612, and/or the condensate drain 616 of the HVAC system 104. The thermostat 102 may generate the recommendation using the process described in step 410. Otherwise, the thermostat 102 proceeds to step 414 in response to determining that the CAI audio signature was not detected by the microphones 108. In this case, the thermostat 102 determines that there is an issue with either the CAI 606 or the IFC 602 that controls the CAI 606.

At step 414, the thermostat 102 determines whether an IFC CAI drive audio signature 120 was detected by the microphones 108. The thermostat 102 may determine whether the IFC CAI drive audio signature 120 was detected by the microphones 108 using a process similar to the process described in step 212 in FIG. 2. In this case, the thermostat 102 compares attributes of an audio signal 116 to audio signatures 120 that are associated with the IFC 602 that controls the CAI 606 to determine whether the IFC CAI drive audio signature 120 is present within the audio signal 116.

The thermostat 102 proceeds to step 416 in response to determining that the IFC CAI drive audio signature 120 was not detected by the microphones 108. In this case, the thermostat 102 determines that there is an issue with the IFC 602 and identifies a fault type that is associated with the IFC 602. At step 416, the thermostat 102 outputs a recommendation to replace the IFC 602. The thermostat 102 may generate the recommendation using a process similar to the process described in step 210 of FIG. 2. For example, the thermostat 102 may identify a component identifier 124 for the IFC 602 and then output a recommendation that includes the component identifier 124 and instructions to replace the IFC 602. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

Returning to step 414, the thermostat 102 proceeds to step 418 in response to determining that the IFC CAI drive audio signature 120 was detected by the microphones 108. In this case, the thermostat 102 determines that the IFC 602 is working properly and that there is an issue with the CAI 606. The thermostat 102 then identifies a fault type that is associated with the CAI 606. At step 418, the thermostat 102 outputs a recommendation to replace the CAI 606. The thermostat 102 may generate the recommendation using a process similar to the process described in step 210 of FIG. 2. For example, the thermostat 102 may identify component identifiers 124 for the CAI 606 and then output a recommendation that includes the component identifier 124 and instructions to replace the CAI 606. In one example, the thermostat 102 may output recommendation by displaying the recommendation on a graphical user interface (e.g. display 508) of the thermostat 102. In another example, the thermostat 102 may output the recommendation by sending the information to a device that is located outside of the space 118.

In some embodiments, the thermostat 102 may also output instructions for repairing the detected fault. After detecting a fault, the thermostat 102 may output information about the components of the HVAC system 104 that are associated with the fault and/or any other information that can be used to service the HVAC system 104. For example, the thermostat 102 may output a component identifier 124 for any components that are associated with the detected fault, location information about where the identified components are located within the HVAC system 104, service instructions for how to repair or replace the identified components, tools for servicing the identified components, and/or any other suitable type of information that is associated with the identified components of the HVAC system 104.

Hardware Configuration for an Analysis Device

Figure 5:
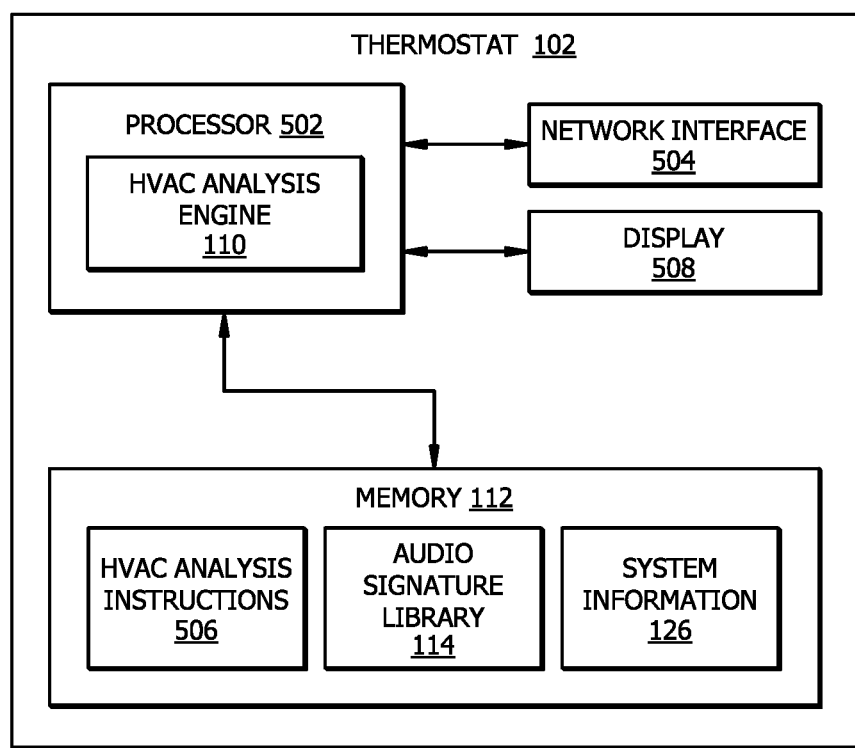
FIG. 5 is an embodiment of an analysis device for the HVAC system.

FIG. 5 is an embodiment of an analysis device (e.g. thermostat 102) of an analysis system 100. As an example, the thermostat 102 comprises a processor 502, a memory 112, and a network interface 504. The thermostat 102 may be configured as shown or in any other suitable configuration.

Processor

The processor 502 comprises one or more processors operably coupled to the memory 112. The processor 502 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 502 may be a programmable logic device, a microcontroller, a microprocessor, or any suitable combination of the preceding. The processor 502 is communicatively coupled to and in signal communication with the memory 112, display 508, microphones 108, and the network interface 504. The one or more processors are configured to process data and may be implemented in hardware or software. For example, the processor 502 may be 8-bit, 16-bit, 32-bit, 64-bit, or of any other suitable architecture. The processor 502 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute HVAC analysis instructions 506 to implement the HVAC analysis engine 110. In this way, processor 502 may be a special-purpose computer designed to implement the functions disclosed herein. In an embodiment, the HVAC analysis engine 110 is implemented using logic units, FPGAs, ASICs, DSPs, or any other suitable hardware. The HVAC analysis engine 110 is configured to operate as described in FIGS. 1-4. For example, the HVAC analysis engine 110 may be configured to perform the steps of process 200, 300, and 400 as described in FIGS. 2, 3, and 4, respectively.

Memory

The memory 112 is operable to store any of the information described above with respect to FIGS. 1-4 along with any other data, instructions, logic, rules, or code operable to implement the function(s) described herein when executed by the processor 502. The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store HVAC analysis instructions 506, an audio signature library 114, system information 126, and/or any other data or instructions. The HVAC analysis instructions 506 may comprise any suitable set of instructions, logic, rules, or code operable to execute the HVAC analysis engine 110. The audio signature library 114 and the system information 126 configured similar to the audio signature library 114 and the system information 126 described in FIGS. 1-4, respectively.

Display

The display 508 is a graphical user interface that is configured to present visual information to a user using graphical objects. Examples of the display 508 include, but are not limited to, a liquid crystal display (LCD), a liquid crystal on silicon (LCOS) display, a light-emitting diode (LED) display, an active-matrix OLED (AMOLED), an organic LED (OLED) display, a projector display, or any other suitable type of display as would be appreciated by one of ordinary skill in the art.

Network Interface

The network interface 504 is configured to enable wired and/or wireless communications. The network interface 504 is hardware device that is configured to communicate data between the thermostat 102 and other devices (e.g. microphones 108 and the HVAC system 104), systems, or domains. For example, the network interface 504 may comprise an NFC interface, a Bluetooth interface, a Zigbee interface, a Z-wave interface, an RFID interface, a WIFI interface, a LAN interface, a WAN interface, a PAN interface, a modem, a switch, or a router. The processor 502 is configured to send and receive data using the network interface 504. The network interface 504 may be configured to use any suitable type of communication protocol as would be appreciated by one of ordinary skill in the art.

HVAC System Configuration

Figure 6:
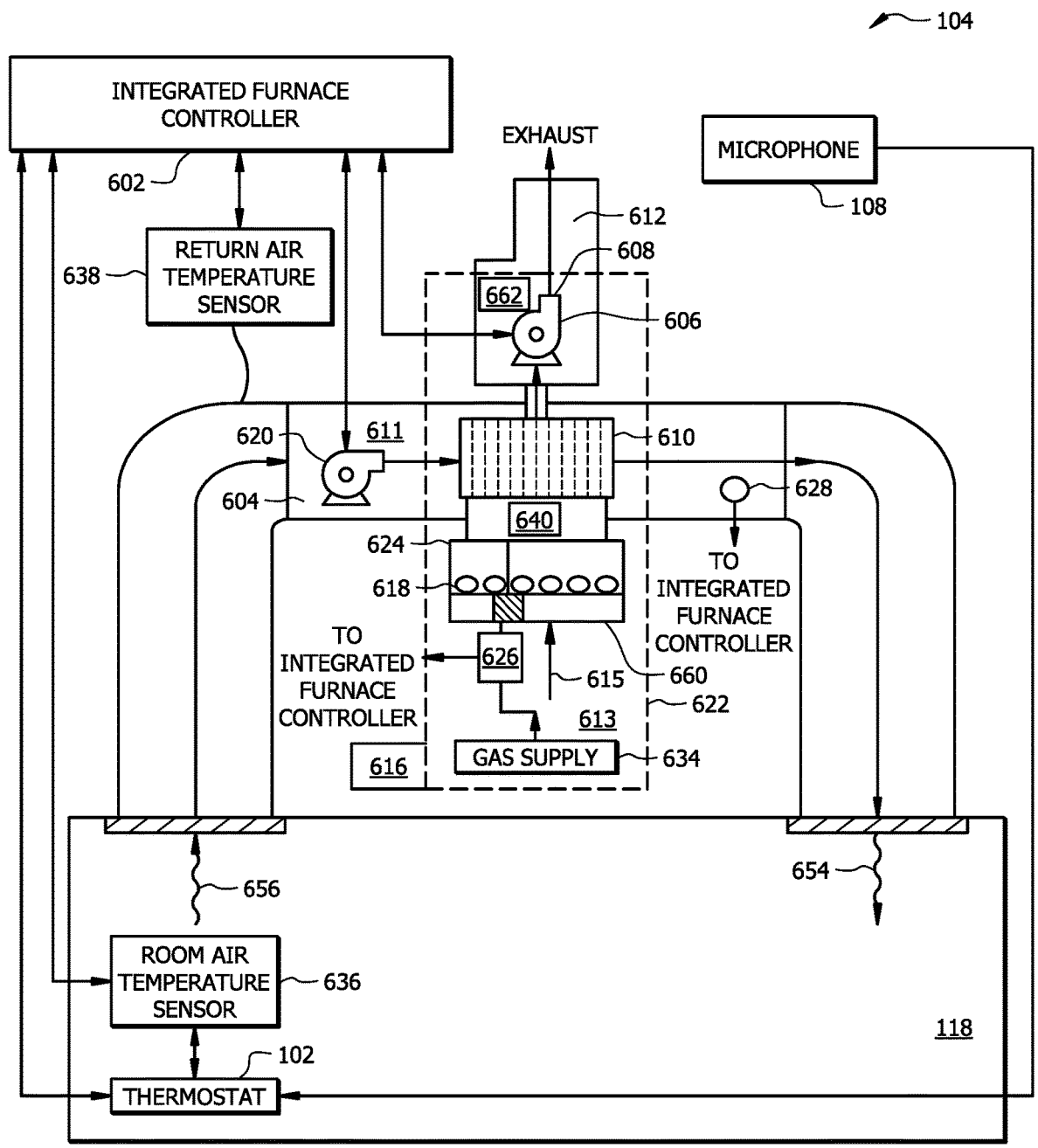
FIG. 6 is a schematic diagram of an embodiment of an HVAC system configured to integrate with the analysis system.

FIG. 6 is a schematic diagram of an embodiment of an HVAC system 104 configured to integrate with an analysis system 100. The HVAC system 104 conditions air for delivery to an interior space of a building or home. In some embodiments, the HVAC system 104 is a rooftop unit (RTU) that is positioned on the roof of a building and the conditioned air is delivered to the interior of the building. In other embodiments, portions of the system may be located within the building and a portion outside the building. The HVAC system 104 may also include cooling elements that are not shown here for convenience and clarity. The HVAC system 104 may be configured as shown in FIG. 6 or in any other suitable configuration. For example, the HVAC system 104 may include additional components or may omit one or more components shown in FIG. 6.

The HVAC system 104 comprises a circulation fan 620, a heating unit 622, a return air temperature sensor 638, a discharge air temperature (DAT) sensor 628, a room air temperature sensor 636, the thermostat 102, and an IFC 602. Portions of the HVAC system 104 may be contained within a cabinet 604. In some embodiments, the IFC 602 may be included within the cabinet 604. The HVAC system 104 is configured to generate heat and to provide the generated heat to a conditioned room or space 118 to control the temperature within the space 118. The HVAC system 104 is configured to employ multi-stage or modulating heating control which allows the HVAC system 104 to configure itself to control the discharge air temperature and to adjust the speed of the circulation fan 620 to fine-tine the discharge air temperature. In one embodiment, the HVAC system 104 may be configured to achieve a three to one (3:1), a five to one (5:1) turndown ratio, or any other suitable turndown ratio. A turndown ratio is the operating range of the HVAC system 104, for example, the ratio of the maximum output to the minimum output. Alternatively, the HVAC system 104 may be configured to achieve any other turndown ratio as would be appreciated by one of ordinary skill in the art upon viewing this disclosure.

The circulation fan 620 is a variable speed unit blower that is operably coupled to the IFC 602. The IFC 602 may adjust the speed of the circulation fan 620 to control the discharge air temperature or temperature rise of the HVAC system 104. The circulation fan 620 may be configured to operate at 10%, 25%, 50%, 75%, 100%, or any other suitable percentage of the maximum speed of the circulation fan 620. The circulation fan 620 may be located near an air intake 611 of the cabinet 604. The circulation fan 620 is configured to circulate air between the cabinet 604 and the space 118. The circulation fan 620 is configured to pull return air 656 from the space 118, to provide the return air 656 to the heating unit 622 to heat the air, and to provide the heated air as supply or discharge air 654 to the space 118.

The heating unit 622 comprises a burner assembly 624 having a plurality of burners 618, a flame sensor 640, a heat exchanger 610, a CAI 606, a pressure switch 662, a condensate drain 616, a gas valve 626, and a gas supply 634. In one embodiment, the heating unit 622 is a single furnace. The heating unit 622 is configured to generate heat for heating air that is communicated from the circulation fan 620 to the space 118. The heating unit 622 is configurable between a plurality of configurations to adjust the amount of heat generated by the heating unit 622. For example, the heating unit 622 may be configured to generate 25% 53%, 64%, 75%, 100%, or any other suitable percentage of the maximum heat output of the heating unit 622.

The burner assembly 624 comprises a gas manifold 660 and a plurality of burners 618. The burners 618 are configured for burning a combustible fuel-air mixture (e.g. gas-air mixture) and to provide a combustion product to the heat exchanger 610. The burners 618 are connected to the fuel source or gas supply 634 via the gas valve 626. The burners 618 may be configured to stay active (i.e. on) during operation or to pulse (i.e. toggle between on and off) during operation. A burner 618 configured to stay active during operation is referred to as a constant burner 618 and a burner 618 configured to pulse during operation is referred to as a pulsed burner 618. A pulsed burner 618 has an adjustable duty cycle so that the percentage of the time period that the pulsed burner 618 is active is adjustable. The pulsed burner 618 is configured to be toggled or modulated using pulse width modulation (PWM). For example, a pulsed burner 618 may be modulated by the IFC 602 using pulse width modulation.

The flame sensor 640 is configured to detect a flame inside of the burner assembly 624. For example, the flame sensor 640 may be configured to generate an electrical signal (e.g. electrical current) in response to heat from a flame within the burner assembly 624. In this configuration, the flame sensor 640 will output an electrical signal when a flame is detected. Otherwise, the flame sensor 640 will not output an electrical signal when a flame is not detected.

The condensate drain 616 is configured to provide an exit route for moisture and fluid from the heating unit 622. Moisture from the heating unit 622 may be collected from flue gas condensation and drained from the heating unit 622 via the condensate drain 616.

The gas valve 626 is configured to allow or disallow gas flow between the gas supply 634 and the gas manifold 660. For example, the gas valve 626 may be operable between an off configuration that substantially blocks gas flow between the gas supply 634 and the gas manifold 660, a low-fire rate configuration that allows a first flow rate of gas to be supplied to the burners 618, and a high-fire rate configuration that allows a second flow rate of gas that is higher than the first flow rate to be supplied to the burners 618. The gas supply 634 is configured to store and provide fuel or gas for the heating unit 622. The gas supply 634 is configured to store and provide any suitable combustible fuel or gas as would be appreciated by one of ordinary skill in the art upon viewing this disclosure.

The heat exchanger 610 comprises a plurality of passageways, for example, a tubular heat exchanger element for each burner 618. The heat exchanger 610 is configured to receive the combustion product from the burner assembly 624 and to use the combustion product to heat air that is blown across the heat exchanger 610 by the circulation fan 620.

The CAI 606 is configured to draw combustion air 615 into the burner assembly 624 (i.e. the burners 618) using an induced draft and is also used to exhaust waste products of combustion from the HVAC system 104 through a vent 608. In an embodiment, the CAI 606 is operable between two speed settings, for example, a low speed that corresponds with the low-fire mode of operation for the burners 618 and a high speed that corresponds with the high-fire mode of operation for the burners 618. The CAI 606 is configured such that the low speed and the high speed correspond to the low-fire gas rate and the high-fire gas rate, respectively, to provide gas-fuel-mixture for the low-fire and high-fire modes of the heat exchanger 610. In one embodiment, the air-fuel mixture is substantially constant through the various heating unit 622 configurations.

The pressure switch 662 is configured to sense negative pressure generated by the CAI 606 while the CAI 606 is operating. The pressure switch 662 is configured to be normally open and to close in response to an increase in differential pressure above a predetermined threshold value.

The return air temperature sensor 638 is configured to determine a return air temperature for the HVAC system 104. For example, the return air temperature sensor 638 may be a temperature sensor configured to determine the ambient temperature of air that is returned to or entering the HVAC system 104 and to provide the temperature data to the IFC 602. In one embodiment, the return air temperature sensor 638 is located in the cabinet 604. Alternatively, the return air temperature sensor 638 may be positioned in other locations to measure the return air temperature for the HVAC system 104. For example, the return air temperature sensor 638 may be positioned in a duct between the cabinet 604 and the space 118.

An example of the DAT sensor 628 includes, but is not limited to, a 10K Negative Temperature Coefficient (NTC) sensor. The DAT sensor 628 is configured to determine a discharge or supply air temperature of the HVAC system 104. For example, the DAT sensor 628 may be a temperature sensor configured to determine the ambient temperature of air that is discharged from the HVAC system 104 and to provide the temperature data to the IFC 602. In one embodiment, the DAT sensor 628 is located in the cabinet 604. Alternatively, the DAT sensor 628 may be positioned in other locations to measure the discharge air temperature of the HVAC system 104. For example, the DAT sensor 628 may be positioned in a duct between the cabinet 604 and the space 118.

The room air temperature sensor 636 is configured to determine an air temperature for the space 118. For example, the room air temperature sensor 636 may be a temperature sensor configured to determine the ambient temperature of the air of the space 118 and to provide the temperature data to the thermostat 102. The room air temperature sensor 636 may be located anywhere within the space 118. The thermostat 102 may be a two-stage thermostat or any suitable thermostat employed in an HVAC system 104 to generate heating calls based on a temperature setting as would be appreciated by one of ordinary skill in the art upon viewing this disclosure. The thermostat 102 is configured to allow a user to input a desired temperature or temperature set point for a designated area or zone such as the space 118.

The IFC 602 may be implemented as one or more CPU chips, logic units, cores (e.g. as a multi-core processor), FPGAs, ASICs, or DSPs. The IFC 602 is operably coupled to and in signal communication with the thermostat 102, the room air temperature sensor 636, the return air temperature sensor 638, the DAT sensor 628, the gas valve 626, the circulation fan 620, and the CAI 606 via one or more input/output (I/O) ports. The IFC 602 is configured to receive and transmit electrical signals among one or more of the thermostat 102, the room air temperature sensor 636, the return air temperature sensor 638, the DAT sensor 628, the gas valve 626, the circulation fan 620, and the CAI 606. The electrical signals may be used to send and receive data (e.g. temperature data) or to operate and control one or more components of the HVAC system 104. For example, the IFC 602 may transmit electrical signals to operate the circulation fan 620 and to adjust the speed of the circulation fan 620. The IFC 602 may be operably coupled to one or more other devices or pieces of HVAC equipment (not shown). The IFC 602 is configured to process data and may be implemented in hardware or software.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A Heating, Ventilation, and Air Conditioning (HVAC) analysis system, comprising:
   a combustion air inducer configured to provide combustion air to an HVAC system;
   an integrated furnace controller configured to control the operation of the combustion air inducer;
   a microphone configured to capture an audio signal of the combustion air inducer; and
   an analysis device operably coupled to the microphone, comprising:
      a memory operable to store an audio signature library comprising a plurality of audio signatures, wherein:
         each audio signature identifies one or more attributes for a portion of an audio signal;
         each audio signature is associated with a fault type for the HVAC system; and
         each fault type is associated with a component identifier for a component of the HVAC system; and
      a processor operably coupled to the memory, configured to:
         operate the HVAC system, wherein operating the HVAC system comprises sending a command to initiate a heat cycle;
         determine a speed of the combustion air inducer;
         determine that the speed of the combustion air inducer exceeds a first speed threshold value;
         in response to determining that the speed of the combustion air inducer exceeds the first speed threshold value, activate the microphone to capture a first audio signal;
         receive the first audio signal from the microphone while operating the HVAC system;
         determine that the speed of the combustion air inducer exceeds a second speed threshold value, wherein the second speed threshold is greater than the first speed threshold value;
         in response to determining that the speed of the combustion air inducer exceeds the second speed threshold value, determine a first audio signature from the plurality of audio signatures of the audio signature library for the combustion air inducer is not present within the first audio signal;
         determine whether a second audio signature from the plurality of audio signatures of the audio signature library for the integrated furnace controller is present within the first audio signal;
         determine a fault type based on the determination of whether the second audio signature for the integrated furnace controller is present within the first audio signal;
         identify a first component identifier for a first component of the HVAC system that is associated with the fault type; and
         output a recommendation identifying the first component identifier.

2. The system of claim 1, wherein:
   the first component identifier corresponds with the integrated furnace controller when the second audio signature for the integrated furnace controller is not present within the first audio signal; and
   the recommendation indicates to replace the integrated furnace controller.

3. The system of claim 1, wherein:
   the first component identifier corresponds with the combustion air inducer when the second audio signature for the integrated furnace controller is present within the first audio signal; and
   the recommendation indicates to replace the combustion air inducer.

4. The system of claim 1, wherein the processor is further configured to transition the microphone from an inactive state to an active state after sending the command to heat the space, wherein:
   the microphone is not configured to capture the first audio signal while in the inactive state; and
   the microphone is configured to capture the first audio signal while in the active state.

5. The system of claim 1, wherein determining whether the second audio signature for the integrated furnace controller is present within the first audio signal comprises:
   generating a representation of the first audio signal; and
   comparing the second audio signature for the integrated furnace controller to the representation of the first audio signal.

6. The system of claim 1, wherein outputting the recommendation comprises displaying the first component identifier on a graphical user interface.

7. The system of claim 1, wherein outputting the recommendation comprises sending the first component identifier to a device that is located outside of the space.

8. The system of claim 1, wherein:
   the memory is further operable to store instructions for servicing the components of the HVAC system; and
   the processor is further configured to output instructions for servicing the first component of the HVAC system that is associated with the first component identifier.

9. A Heating, Ventilation, and Air Conditioning (HVAC) analysis method, comprising:
   operating an HVAC system, wherein operating the HVAC system comprises sending a command to initiate a heat cycle;
   determining a speed of a combustion air inducer, wherein the combustion air inducer is configured to provide combustion air to the HVAC system;
   determining that the speed of the combustion air inducer exceeds a first speed threshold value;
   in response to determining that the speed of the combustion air inducer exceeds the first speed threshold value, activating a microphone to capture a first audio signal;
   receiving the first audio signal from the microphone while operating the HVAC system;
   determining that the speed of the combustion air inducer exceeds a second speed threshold value, wherein the second speed threshold is greater than the first speed threshold value;
   identifying a first audio signature for the combustion air inducer from an audio signature library comprising a plurality of audio signatures, wherein:
      each audio signature identifies one or more attributes for a portion of an audio signal;
      each audio signature is associated with a fault type for the HVAC system; and
      each fault type is associated with a component identifier for a component of the HVAC system;
   in response to determining that the speed of the combustion air inducer exceeds the second speed threshold value, determining the first audio signature for the combustion air inducer is not present within the first audio signal;

identifying a second audio signature for an integrated furnace controller from the plurality of audio signatures of the audio signature library;
determining whether the second audio signature for the integrated furnace controller is present within the first audio signal;
determining a fault type based on the determination of whether the second audio signature for the integrated furnace controller is present within the first audio signal;
identifying a first component identifier for a first component of the HVAC system that is associated with fault type; and
outputting a recommendation identifying the first component identifier.

10. The method of claim 9, wherein:
the first component identifier corresponds with the integrated furnace controller when the second audio signature for the integrated furnace controller is not present within the first audio signal; and
the recommendation indicates to replace the integrated furnace controller.

11. The method of claim 9, wherein:
the first component identifier corresponds with the combustion air inducer when the second audio signature for the integrated furnace controller is present within the first audio signal; and
the recommendation indicates to replace the combustion air inducer.

12. The method of claim 9, further comprising transitioning the microphone from an inactive state to an active state after sending the command to heat the space, wherein:
the microphone is not configured to capture the first audio signal while in the inactive state; and
the microphone is configured to capture the first audio signal while in the active state.

13. The method of claim 9, wherein determining whether the second audio signature for the integrated furnace controller is present within the first audio signal comprises:
generating a representation of the first audio signal; and
comparing the second audio signature for the integrated furnace controller to the representation of the first audio signal.

14. The method of claim 9, wherein outputting the recommendation comprises displaying the first component identifier on a graphical user interface.

15. The method of claim 9, wherein outputting the recommendation comprises sending the first component identifier to a device that is located outside of the space.

16. A Heating, Ventilation, and Air Conditioning (HVAC) analysis device, comprising:
a memory operable to store an audio signature library comprising a plurality of audio signatures, wherein:
each audio signature identifies one or more attributes fora portion of an audio signal;
each audio signature is associated with a fault type for an HVAC system; and
each fault type is associated with a component identifier for a component of the HVAC system; and
a processor operably coupled to the memory, configured to:
operate the HVAC system, wherein operating the HVAC system comprises sending a command to initiate a heat cycle;
determine a speed of a combustion air inducer, wherein the combustion air inducer is configured to provide combustion air to the HVAC system;
determine that the speed of the combustion air inducer exceeds a first speed threshold value;
in response to determining that the speed of the combustion air inducer exceeds the first speed threshold value, activate the microphone to capture a first audio signal;
receive the first audio signal from the microphone while operating the HVAC system;
determine that the speed of the combustion air inducer exceeds a second speed threshold value, w herein the second speed threshold is greater than the first speed threshold value;
in response to determining that the speed of the combustion air inducer exceeds the second speed threshold value, determine a first audio signature from the plurality of audio signatures of the audio signature library for the combustion air inducer is not present within the first audio signal;
determine whether a second audio signature from the plurality of audio signatures of the audio signature library for an integrated furnace controller is present within the first audio signal;
determine a fault type based on the determination of whether the second audio signature for the integrated furnace controller is present within the first audio signal;
identify a first component identifier for a first component of the HVAC system that is associated with fault type; and
output a recommendation identifying the first component identifier.

17. The device of claim 16, wherein:
the first component identifier corresponds with the integrated furnace controller when the second audio signature for the integrated furnace controller is not present within the first audio signal; and
the recommendation indicates to replace the integrated furnace controller.

18. The device of claim 16, wherein:
the first component identifier corresponds with the combustion air inducer when the second audio signature for the integrated furnace controller is present within the first audio signal; and
the recommendation indicates to replace the combustion air inducer.

19. The device of claim 16, wherein the processor is further configured to transition the microphone from an inactive state to an active state after sending the command to heat the space, wherein:
the microphone is not configured to capture the first audio signal while in the inactive state; and
the microphone is configured to capture the first audio signal while in the active state.

20. The device of claim 16, wherein determining whether the second audio signature for the integrated furnace controller is present within the first audio signal comprises:
generating a representation of the first audio signal; and
comparing the second audio signature for the integrated furnace controller to the representation of the first audio signal.

* * * * *